(12) United States Patent
Nayrac et al.

(10) Patent No.: US 7,900,887 B2
(45) Date of Patent: Mar. 8, 2011

(54) ASSEMBLY OF AN ENERGY TRANSMISSION MEMBER FOR A HAND-OPERATED DEVICE AND AN ENERGY SOURCE HAVING MEANS FOR THE LOCKING IN ROTATION AND ANGULAR INDEXING OF THE SOURCE

(75) Inventors: Frederic Nayrac, Bourg les Valence (FR); Patrick Herelier, Saint Jean de Muzols (FR); Cyril Marion, Valence (FR); Roland Almeras, Touron (FR)

(73) Assignee: Societe de Prospection Et d'Inventions Techniques Spit, Bourg les Valence (FR)

( * ) Notice: Subject to any disclaimer, the term of this patent is extended or adjusted under 35 U.S.C. 154(b) by 619 days.

(21) Appl. No.: 11/910,011

(22) PCT Filed: Apr. 25, 2006

(86) PCT No.: PCT/IB2006/001003

§ 371 (c)(1),
(2), (4) Date: Sep. 28, 2007

(87) PCT Pub. No.: WO2006/114690

PCT Pub. Date: Nov. 2, 2006

(65) Prior Publication Data

US 2009/0133765 A1    May 28, 2009

(30) Foreign Application Priority Data

Apr. 26, 2005 (FR) .................................. 05 04156

(51) Int. Cl.
*F16K 51/00*    (2006.01)

(52) U.S. Cl. .............. 251/149.9; 251/149.1; 137/614.19
(58) Field of Classification Search .............. 251/149.1, 251/149.6, 149.9; 137/614.17, 614.19
See application file for complete search history.

(56) References Cited

U.S. PATENT DOCUMENTS 2,015,786 A     10/1935    Carcano
4,905,965 A  *  3/1990     Dolev ...................... 251/149.9

(Continued)

FOREIGN PATENT DOCUMENTS

ES    2115932 T3    7/1998

(Continued)

OTHER PUBLICATIONS

International Search Report for PCT/IB2006/001003 mailed Aug. 23, 2006.

(Continued)

*Primary Examiner* — John K Fristoe, Jr.
(74) *Attorney, Agent, or Firm* — Lowe, Hauptman, Ham & Berner, LLP (ITW)

(57) ABSTRACT

In the assembly of the invention, the assembly includes adapter means designed to connect the transmission member and the energy source and to ensure good transmission of energy between them. The adapter means comprise means for locking the energy source in rotation in the device and means for the angular indexing of the source in the position in which it is locked in rotation in the device. The invention is very suitable for gas fastening devices.

10 Claims, 6 Drawing Sheets

U.S. PATENT DOCUMENTS

| | | | |
|---|---|---|---|
| 5,330,154 A | | 7/1994 | Mashburn et al. |
| 6,003,506 A | | 12/1999 | Long et al. |
| 6,138,714 A | * | 10/2000 | Kim ...................... 137/614.05 |
| 6,422,267 B1 | * | 7/2002 | Makishima et al. ...... 137/616.7 |
| 6,827,329 B2 | * | 12/2004 | Mikiya et al. .................. 251/97 |
| 6,889,731 B2 | * | 5/2005 | Vallon et al. ................. 141/351 |
| 6,899,132 B2 | * | 5/2005 | Mikiya et al. ............ 137/616.7 |
| 2004/0011844 A1 | | 1/2004 | Revol |

FOREIGN PATENT DOCUMENTS

| | | |
|---|---|---|
| FR | 2683295 A1 | 5/1993 |
| FR | 2845148 A1 | 4/2004 |
| FR | 1468788 A1 | 10/2004 |
| WO | 0135015 A1 | 5/2001 |

OTHER PUBLICATIONS

ES Search Report for P200750066 mailed Feb. 18, 2010.

* cited by examiner

ASSEMBLY OF AN ENERGY TRANSMISSION MEMBER FOR A HAND-OPERATED DEVICE AND AN ENERGY SOURCE HAVING MEANS FOR THE LOCKING IN ROTATION AND ANGULAR INDEXING OF THE SOURCE

RELATED APPLICATIONS

The present application is based on International Application No. PCT/IB2006/001003 filed Apr. 25, 2006, and claims priority from French Application Number 0504156 filed Apr. 26, 2005, the disclosures of which are hereby incorporated by reference herein in their entirety.

The invention arises from a problem encountered in gas fastening devices drawing their combustion and drive energy for a piston for driving a fastening element from a gas cartridge connected to a distribution member for filling the combustion chambers of these devices, this member generally consisting of a solenoid valve.

Possible gas fastening devices are, e.g. nail drivers, hammers and other staplers.

These devices include a housing for receiving a cartridge held in this housing by means integral with the devices, such as, e.g. a flap, a cap or a fork slid into a channel in the outlet fittingly of the cartridge.

However, all of these arrangements have the disadvantage that they allow the cartridges to rotate about their axes in their housings upon firing, thereby damaging the seals and therefore affecting the quality of the sealing of the duct extending through the outlet fitting of the cartridge and the filling fitting of the solenoid valve.

The Applicant has therefore tried to find a solution preventing the cartridges from rotating in relation to their devices.

The invention thus relates to an assembly consisting of a distribution member having a fitting for the admission of gas into the combustion chamber of a gas fastening device and a gas cartridge having an outlet fitting with adapter means designed to connect the distribution member and the cartridge and to ensure sealing between their fittings, characterised in that the adapter means comprise means for locking the cartridge in rotation in the device and means for the angular indexing of the cartridge in the position in which it is locked in rotation in the device.

In this manner and by virtue of the invention, an operator can introduce a cartridge of the assembly according to the invention into the housing of the device intended to receive it in any desired angular position while still ensuring that it will be locked in rotation. The advantage of the invention is to offer both locking in rotation and angular indexing of the cartridge, thereby avoiding the tiresome constraint of having to introduce it into the device in a predetermined angular position corresponding to the position in which it is locked in rotation.

It has already been stated hereinabove that the invention arose from a problem encountered with gas fastening devices. However, the Applicant does not intend to limit the scope of his application solely to the use of gas cartridges in fastening devices.

A gas cartridge is an energy source for a gas combustion device in which sealing must be ensured between the cartridge and the admission member. The invention of this application in fact applies equally to any other energy source for a hand-operated device, such as electric fastening devices operating with the aid of a battery which has to be held in a good angular position in order to ensure a good electrical connection between the lugs of the battery and the connecting terminals of the connector of the device.

The invention therefore relates more generally to an assembly consisting of an energy transmission member for a hand-operated device and an energy source with adapter means designed to connect the transmission member and the energy source and to ensure good transmission of energy between them, characterised in that the adapter means comprise means for locking the energy source in rotation in the device and means for the angular indexing of the source in the position in which it is locked in rotation in the device.

In the invention, the cartridge and the battery play the same role as an energy source, as do the solenoid valve and the energy transmission connector, with, in one case, the aim of good sealing and, in the other case, the aim of quality electrical contact.

The angular indexing means are advantageously automatic indexing means or auto-indexing means, preferably perfectly random automatic indexing means.

In the preferred embodiment of the assembly of the invention, the means for locking in rotation comprise at least one locking fin integral with one of the two elements to be connected and a notch for receiving the fin integral with the other element, the fin and the locking notch advantageously extending in axial planes of the two elements respectively.

The locking notch is also advantageously formed in a locking and indexing skirt including at least one indexing ramp designed to cooperate with the locking and therefore indexing fin in order to drive the element with which the fin is integral in rotation.

The skirt is preferably tubular and the indexing ramp is an intersection of the skirt by a tubular element having an axis orthogonal to that of the skirt.

Still in the preferred embodiment of the assembly of the invention, for use in a gas device, the adapter means are designed to hook flexibly on to an intermediate fitting, preferably mounted on the distribution member, preferably connected in a sealed manner to the inlet fitting of the distribution member by means of the locking and indexing skirt screwed on to the distribution member.

The Applicant of course also intends to claim by way of intermediate products both the cartridge and the distribution member provided respectively with a locking and indexing adapter or a locking and indexing skirt of the assembly of the invention, as well as the adapter and the locking and indexing skirt for the assembly of the invention.

The invention will be more readily understood with the aid of the following description of a preferred embodiment of the assembly of the invention, with a few variants, with reference to the accompanying drawings, in which.

Figure 1:
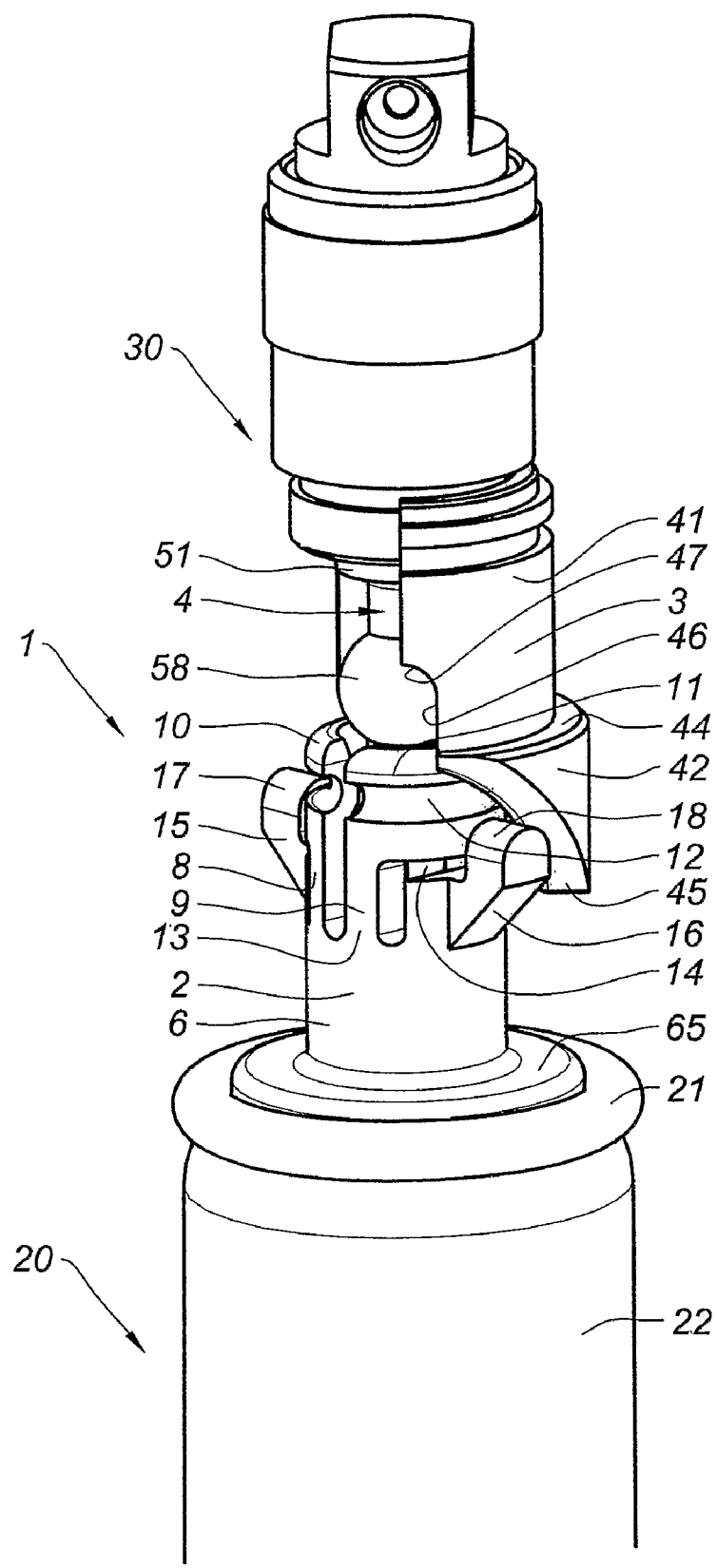
FIG. 1 is a cut-away perspective view of a cartridge adapter and a solenoid valve skirt of a gas device during the angular indexing of the cartridge.
Figure 2:
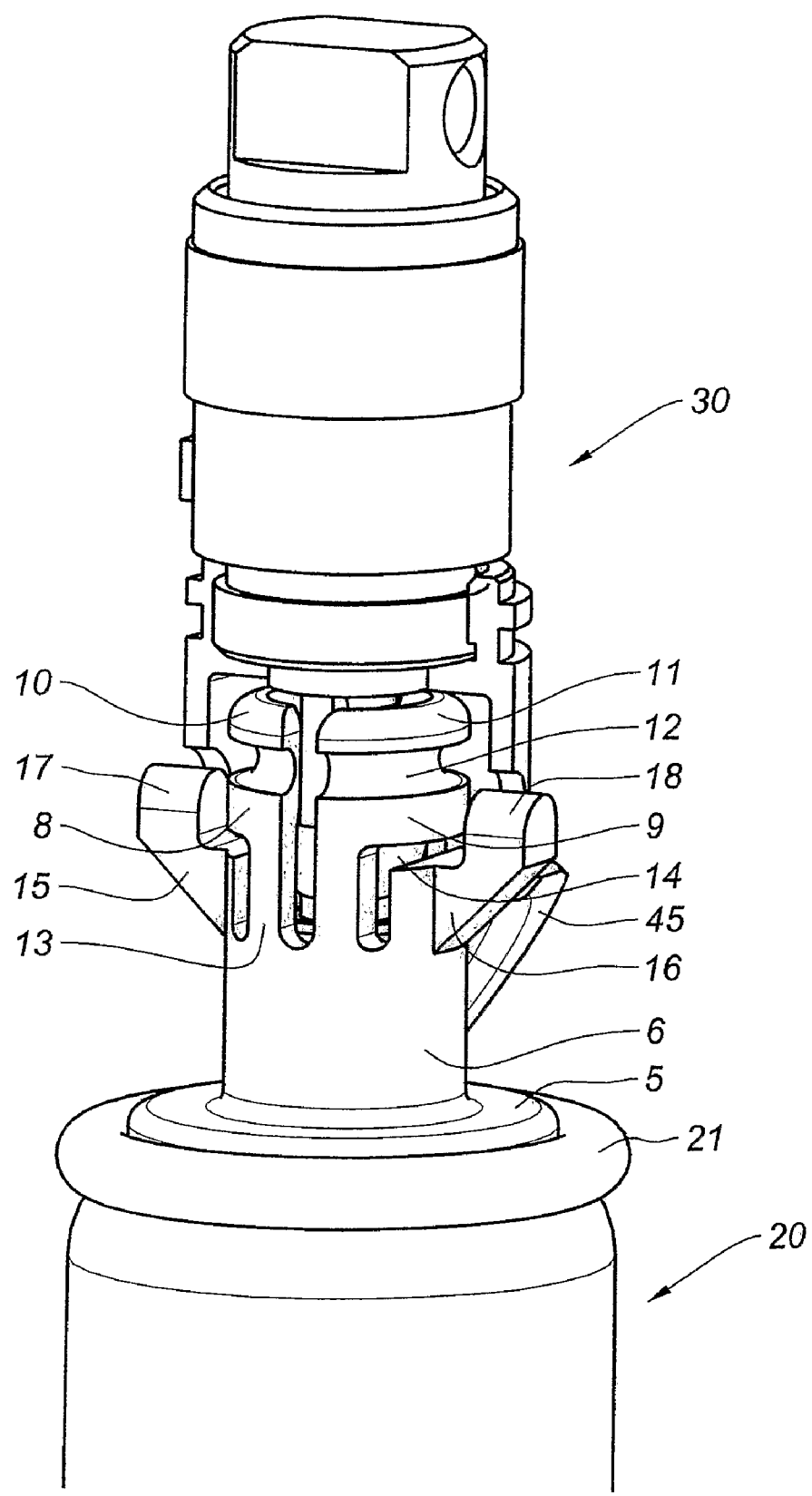
FIG. 2 is a cut-away perspective view of the cartridge adapter and the solenoid valve skirt of FIG. 1, in the position in which they are locked in rotation.
Figure 3:
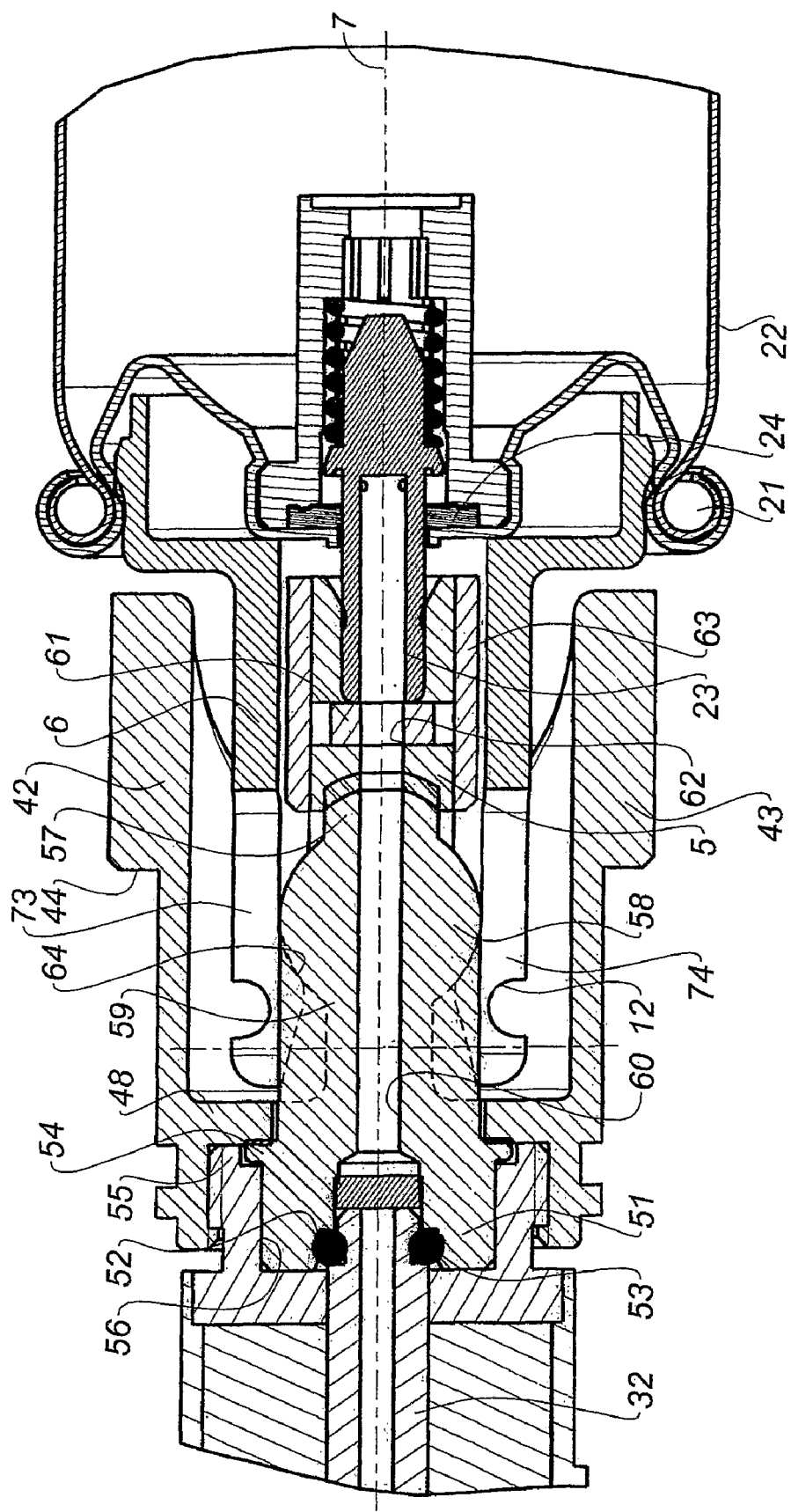
FIG. 3 is an axial section of the cartridge and the solenoid valve of the assembly of FIGS. 1 and 2, in the position in which they are hooked and locked in rotation.

The elements which will now be described are intended to connect a propellant cartridge 20 and a distribution member, in this case a solenoid valve 30 for filling the combustion chamber of a hand-operated gas device, in this case a fastening device, in a sealed and continuous manner by mutual hooking and locking in rotation.

A fastening device for fastening elements by means of a piston driven by compressed gas comprises an internal combustion engine comprising a combustion chamber intended to be supplied with compressed gas from a gas cartridge 20 in order to drive the piston itself intended to drive the fastening elements.

In this particular example, connecting members 1 intended to connect the solenoid valve 30 and the compressed gas cartridge 20 are provided.

The cartridge 20 of generally cylindrical shape is provided in an internal casing with the compressed gas in the liquid state and between the internal casing and an external casing 2 with a propellant. A circular edge 21 forms a continuation of the external cylindrical wall of the cartridge 20, at one of the ends of the latter. A male outlet fitting 23 connected to the internal casing projects from the cartridge by means of a base 24 situated in the centre of the dish formed in the interior of the edge 21.

The solenoid valve 30 of generally cylindrical shape is provided at one of its ends with an inlet fitting 32 connected in the interior of the solenoid valve to an outlet fittings (not shown).

The inlet fitting 32 is in this case a male fitting.

The connecting members 1 comprise:
an adapter 2, in this case mounted on the cartridge 20, for hooking, angular indexing and locking in rotation;
a skirt 3, in this case mounted on the solenoid valve 30, for angular indexing and locking in rotation;
an intermediate fitting 4 mounted on the solenoid valve 30, and
a sealing connector 5 mounted in the adapter 2.

Adapter

The adapter 2 serves as a support for the sealing connector 5, serves for the mutual hooking of the cartridge 20 and the solenoid valve 30 and serves for the angular indexing and locking in rotation of the cartridge and the solenoid valve in cooperation with the skirt 3 of the solenoid valve 30.

The adapter 2 includes a flat, in this case, circular supporting base 65 to which fastening legs extending into the internal dish of the edge perpendicularly to the base and spread apart in order to engage with the internal wall of the edge 21 are connected.

On the other side of the fastening legs, the supporting base 65 is extended by a tubular chamber 6 having an axis 7 and a considerably smaller section than the base 65. This chamber is slotted in an axial plane in order to give two slightly hinged hooking legs 8, 9 substantially halfway along the chamber. The free ends 10, 11 of the hooking legs are designed as semi-circular beads each forming an internal circular hooking shoulder 64 for a spherical element of the intermediate fitting of the solenoid valve.

A peripheral groove 12 for receiving a torus (not shown) for pressing the legs together is formed on the exterior of the free ends 10, 11 of the hooking legs 8, 9. So that they can be hinged, the hooking legs are partially hollowed out so that they are generally in the form of an inverted U hinged about the ends 13 of the two parallel legs of the U.

Ribs or fins 15, 16 project radially towards the exterior in the same axial plane from the internal portions of the hollowed-out windows 14 in the two hooking legs 8, 9 in order to provide transverse end bosses 17, 18 projecting slightly from the chamber 6, extending substantially in the transverse plane of the groove 12 and intended to be received in the bottoms of lateral channels in the indexing and locking skirt 3.

Indexing and Locking Skirt

This is a generally tubular element having an axis 7 provided on one side with an end 41 for fastening to the solenoid valve and on the other side with indexing flanges 42, 43 formed in a tubular portion which is thicker than the fastening portion, has the same internal wall and therefore forms an annular external shoulder 44.

In general, these indexing flanges 42, 43 have been obtained by the intersection of the said thick tubular portion by a tubular element having an axis orthogonal to the axis 7, giving edges 45 acting as annular indexing ramps. Each indexing flange has two ramp portions 45 inclined in opposite directions with top rounding between them and extending substantially over 180°. Two lateral anti-rotation channels 46 each extending in the same axial plane to a bottom 47 in the thin tubular fastening portion 41 have been cut out in the axial plane separating the two flanges 42, 43.

Intermediate Fitting

This is a tubular spacer 4 provided at one end with a sleeve portion 51 for covering the fitting 32 of the solenoid valve, with a small annular internal shoulder 52 for receiving a seal 53 and a small peripheral external rib 54 intended to come to bear against the edge 55 of the dish 56 from which the fitting 32 of the solenoid valve projects and to be ripped between this edge and an annular internal rim 48 of the skirt 3. The intermediate spacer 4 is provided at the other end with a small tubular end portion 57 intended to be introduced into the seating connector 5. A spherical hooking portion 58 connected to the sleeve portion 51 by a thin part 59 is situated adjacent to the end portion 57.

The spacer 4 is traversed from one end to the other by a duct 60 for the passage of gas having an axis 7.

Sealing Connector

This is a seal 5 having a generally tubular shape. It includes an annular transverse portion 61 forming a passage 62 and giving the seal an H-shaped axial section. The seal 5 is in this case made of a relatively flexible elastomeric material.

The seal 5 is mounted inside a rigid bushing 63. This is also a tubular component. The external diameter of the bushing 63 is substantially equal to the internal diameter of the chamber 6 of the adapter 2. The internal diameter is substantially equal to the external diameter of the seal 5. The seal 5 and the bushing 63 have substantially the same axial length. However, the bushing 63 can slide freely inside the chamber 6.

The connection of the inlet fitting 32 of the solenoid valve 30 and the outlet fitting 23 of the cartridge 20 will now be described.

Once the intermediate fitting 4 has been introduced by means of its sleeve 51 into the dish 56 of the solenoid valve, it is covered by the skirt 3 by fastening the skirt 3 to the solenoid valve by means of its end 41, in this case by screwing this fastening end 41 on to the edge 55 of the dish 56, the skirt 3 in this case being tapped and the edge of the solenoid valve being threaded.

Once the adapter 2 has also been mounted on the cartridge 20 after the cartridge has been introduced into its housing in the device, it is pushed towards the solenoid valve.

If the angular position of the cartridge is not correct, the fins 15, 16 of the adapter 2 come to a stop against the edges 45 of the skirt by means of their end bosses 17, 18. By virtue of their inclination, as they continue to push the cartridge towards the solenoid valve, the fins 15, 16 will slide on to the edges 45, thereby rotating the cartridge as a result of the ramp effect, i.e. indexing it angularly, until these fins engage in the lateral channels 46 in the skirt 3. It will be noted that the indexing means are automatic and random indexing means as indexing can take place from any initial angular position of the cartridge.

As soon as the fins 15, 16 begin to engage in the channels 46 in the skirt, with the cartridge then being locked in rotation, the hooking legs 8, 9 of the adapter 2 come into contact with the spherical portion 58 of the intermediate fitting 4, which spreads them apart until, as a result of the action of the return torus (not shown), when the spherical portion is situated at the hollowed-out windows 14, they are pressed together again over this spherical portion in order to ensure that the adapter of the cartridge is hooked on to the intermediate fitting of the solenoid valve, i.e. that the two fittings 23, 32 are connected in a sealed manner.

Figure 4:
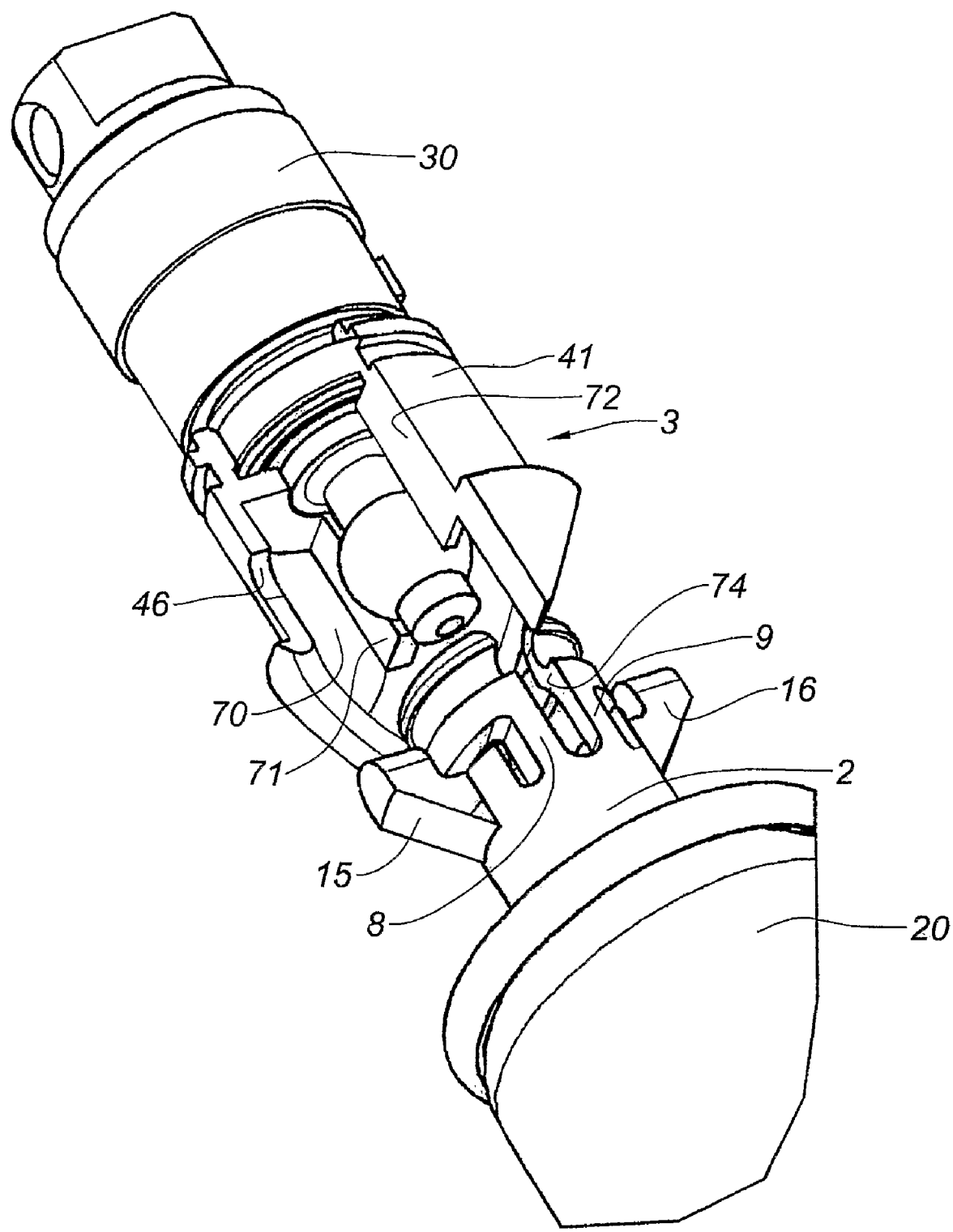
FIG. 4 is a perspective view of the assembly with a variant embodiment of the solenoid valve skirt, prior to hooking and locking in rotation.

For safety reasons and in order to ensure the correct positioning of the cartridge 20 with its adapter 2 and to compensate for the width of the channel 46 possibly being slightly too large for the fins 15, 16, it is possible, as in this case (FIGS. 4 and 5), to provide angular positioning ribs 71, 72 on the internal wall 70 of the tubular fastening portion 41, of the indexing and locking skirt 3, these extending substantially in an axial plane and diametrically opposite one another in order to cooperate with the grooves 73, 74 formed between the hooking legs 8, 9 of the adapter 2. The ribs 71, 72 extend axially substantially from the transverse plane of the annular rim 48 to the transverse plane of the annular external shoulder 44, their length corresponding substantially to double that of the grooves 73, 74 in the adapter.

Figure 5:
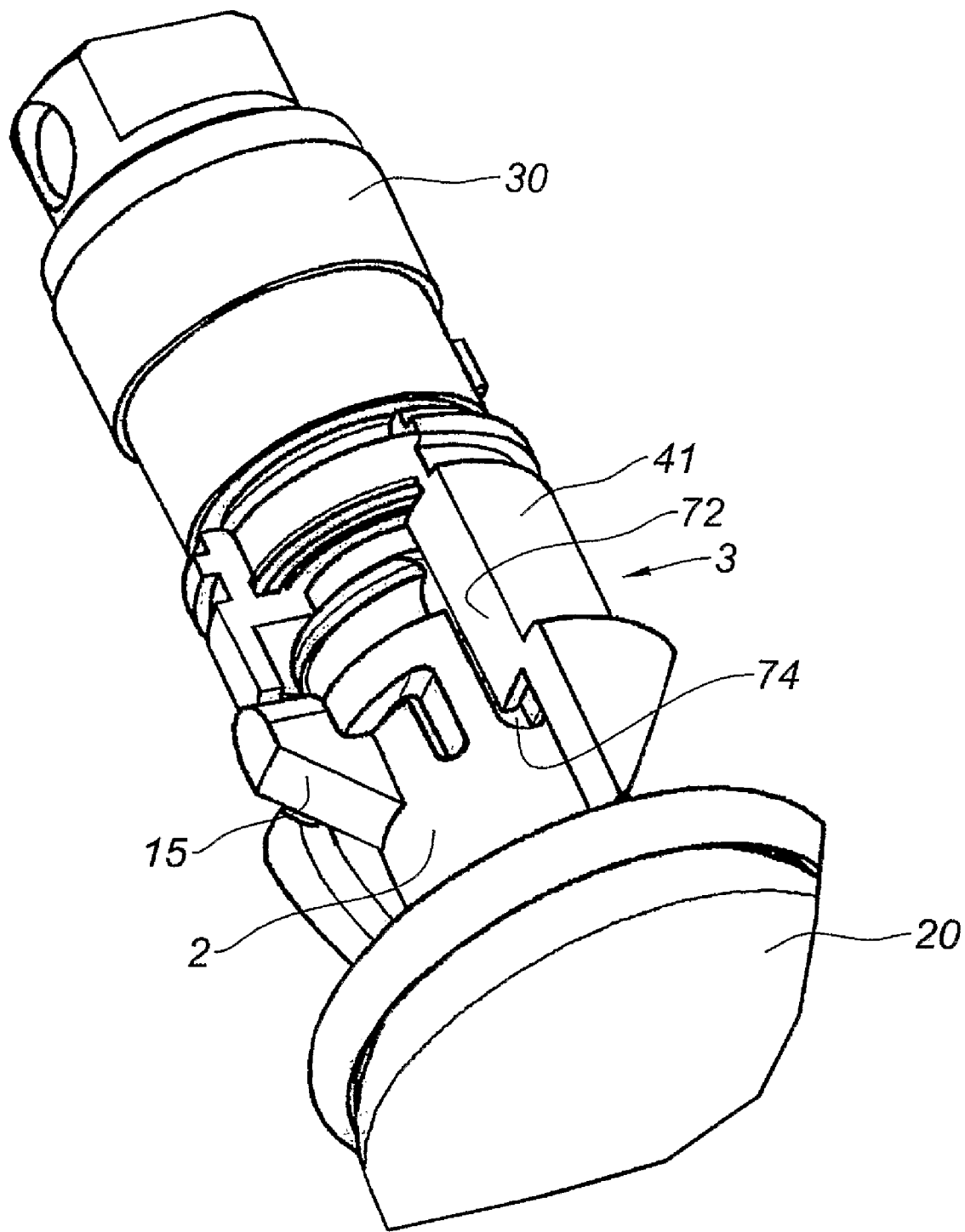
FIG. 5 is an analogous view to that of FIG. 4, after hooking.

When the fins 15, 16 engage in the channels 46 in the skirt 3, their ribs 71, 72 engage in the grooves 73, 74 in the adapter so as to completely angularly lock the skirt 3 and the adapter 2, i.e. the solenoid valve 30 and the cartridge 20 (FIG. 5).

Figure 6:
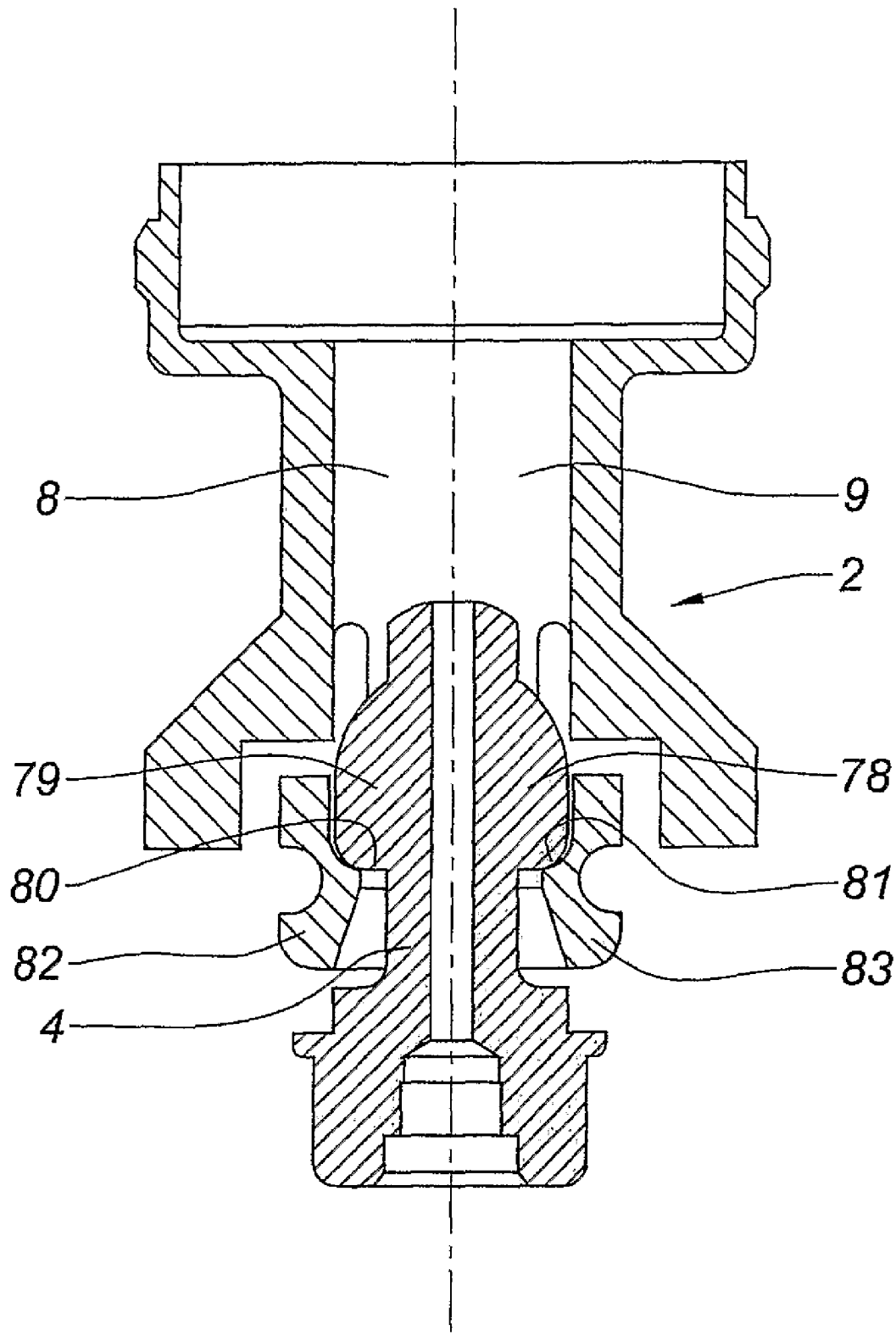
FIG. 6 is an axial section of a variant embodiment of the intermediate fitting.

In order to increase the retention force of the hooking element of the intermediate fitting 4 gripped by the adapter 2 by means of its hooking legs 8, 9, this hooking element 78 can be in the form (FIG. 6) of a flattened sphere with a portion 79 once again of revolution with a much smaller radius of curvature on the side of the spacer 4, the internal shoulders 80, 81 of the free ends 82, 83 of the hooking legs 8, 9 of the adapter being designed in a corresponding manner so that they can be hooked thereon.

The invention claimed is:

1. An assembly, comprising:
   an energy transmission member for a hand-operated device,
   an energy source,
   an adapter configured to connect the transmission member and the energy source, said adapter being on one of the transmission member and the energy source and including a locking fin; and
   a locking and indexing skirt on the other one of the transmission member and the energy source and including
   a locking notch engageable with the locking fin for locking the energy source against rotation relative to the hand-operated device, and
   at least one indexing ramp configured to cooperate with the locking fin in order to rotationally guide the source toward a locked position in which the source is to be locked against rotation relative to the hand-operated device.

2. The assembly according to claim 1, wherein the skirt is tubular and the indexing ramp is an intersection of the skirt by a tubular element having an axis orthogonal to that of the skirt.

3. An assembly comprising an energy transmission member for a hand-operated device and an energy source,
   wherein the assembly further comprises an adapter configured to connect the transmission member and the energy source,
   wherein the adapter comprises
   a locking structure for locking the energy source against rotation relative to the hand-operated device, and
   angularly guiding structure for angularly guiding the source toward a locked position in which the source is to be locked against rotation relative to the hand-operated device,
   wherein the hand-operated device is a gas fastening device,
   wherein the energy transmission member is a distribution member having an inlet fitting for the admission of gas into the combustion chamber of the gas fastening device,
   wherein the energy source is a gas cartridge having an outlet fitting, the adapter being configured to connect the transmission member and the cartridge and to ensure sealing between the inlet and outlet fittings,
   wherein the assembly further comprises an intermediate fitting and the adapter is configured to hook flexibly on the intermediate fitting.

4. The assembly according to claim 3, wherein the intermediate fitting is mounted on the distribution member.

5. The assembly according to claim 4, wherein the intermediate fitting is connected in a sealed manner to the inlet fitting of the distribution member.

6. The assembly according to claim 5, further comprising:
   a locking and indexing skirt screwed on to the distribution member for sealing between the inlet fitting and the intermediate fitting.

7. The assembly according to claim 3, wherein
   the intermediate fitting includes a spherical hooking portion, and
   the adapter includes hinged hooking legs configured to be spread apart over the spherical portion then pressed together again over the spherical portion in order to flexibly hook the adapter on the intermediate fitting.

8. The assembly according to claim 1, wherein the locking and indexing skirt includes angular positioning ribs configured to cooperate with grooves in the adapter.

9. The assembly according to claim 3, wherein the intermediate fitting includes a hooking element in the form of a flattened sphere.

10. The assembly according to claim 1, wherein
    the hand-operated device is a gas fastening device,
    the energy transmission member is a distribution member having an inlet fitting for the admission of gas into the combustion chamber of the gas fastening device,
    the energy source is a gas cartridge having an outlet fitting, and
    the adapter comprises a sealing connector configured to connect the transmission member and the cartridge and to ensure sealing between the inlet and outlet fittings.

* * * * *